(12) United States Patent
Anca et al.

(10) Patent No.: US 8,919,890 B2
(45) Date of Patent: Dec. 30, 2014

(54) WHEEL WITH INCREASED INTERIOR LIP DEPTH

(76) Inventors: Segiu Anca, Garden Grove, CA (US);
Frank J. Hodges, Yorba Linda, CA (US)

( * ) Notice: Subject to any disclaimer, the term of this patent is extended or adjusted under 35 U.S.C. 154(b) by 618 days.

(21) Appl. No.: 12/917,392

(22) Filed: Nov. 1, 2010

(65) Prior Publication Data

US 2011/0140507 A1    Jun. 16, 2011

Related U.S. Application Data

(60) Provisional application No. 61/257,438, filed on Nov. 2, 2009.

(51) Int. Cl.

| | |
|---|---|
| *B60B 3/10* | (2006.01) |
| *B60B 3/04* | (2006.01) |
| *B60B 25/00* | (2006.01) |
| *B60B 3/00* | (2006.01) |
| *B60B 7/01* | (2006.01) |
| *B60B 7/02* | (2006.01) |
| *B60B 7/06* | (2006.01) |
| *B60B 23/10* | (2006.01) |

(52) U.S. Cl.
CPC ............. *B60B 25/002* (2013.01); *B60B 3/002* (2013.01); *B60B 3/10* (2013.01); *B60B 7/01* (2013.01); *B60B 7/02* (2013.01); *B60B 7/063* (2013.01); *B60B 23/10* (2013.01)
USPC ................... 301/64.101; 301/63.103

(58) Field of Classification Search
CPC ........ B60B 3/002; B60B 3/041; B60B 3/042; B60B 3/044; B60B 3/045; B60B 3/048; B60B 3/10; B60B 23/10; B60B 25/00; B60B 25/002; B60B 7/01; B60B 7/063
USPC ........ 301/29.2, 35.1, 63.101, 63.103, 64.101, 301/65, 95.101, 95.11; 152/396; D12/204, D12/208, 209, 211
See application file for complete search history.

(56) References Cited

U.S. PATENT DOCUMENTS

| | | | |
|---|---|---|---|
| 1,377 | A | 10/1839 | Cockley |
| 5,126 | A | 5/1847 | Whitney |

(Continued)

FOREIGN PATENT DOCUMENTS

| | | |
|---|---|---|
| CH | 619 895 | 10/1980 |
| DE | 36 30 226 | 3/1987 |

(Continued)

OTHER PUBLICATIONS www.aaarims.com/cgi-bin/Web-store/web_store.cgi; pp. 7-8, Rozzi Battle wheel for GMC vehicles, site accessed Apr. 27, 2004.

*Primary Examiner* — Kip T Kotter
(74) *Attorney, Agent, or Firm* — Darius Gleason, Esq.

(57) ABSTRACT

Disclosed are various embodiments of wheels having an increased interior lip depth. In some embodiments, the wheel can include a wheel barrel having a register formed on the inner surface thereof. A wheel center piece can have a junction rim secured to the register. The wheel center piece can include a center portion configured to be secured to a vehicle. The wheel center piece can include spokes which extend radially outwardly from the center portion and axial extenders which connect the radially outward ends of the spokes to the junction rim. The axial extenders can function to increase the size of the cavity formed between the wheel center piece and the inboard end of the wheel. Thus, the cavity can have a volume sufficient to accommodate mechanical components of the vehicle while allowing the register can be formed relatively close to the inboard side of the wheel, thereby increasing the depth of the interior lip extending from the outboard end of the wheel to the junction rim. In some embodiments, a one-piece wheel may be configured to have the appearance of being a multi-piece wheel having an increased interior lip depth. In some embodiments, a wheel component covering insert may be applied to the inner surface of the wheel barrel.

21 Claims, 9 Drawing Sheets

(56) References Cited

U.S. PATENT DOCUMENTS

| | | |
|---|---|---|
| 253,797 A | 2/1882 | Weyburn |
| 1,175,315 A | 3/1916 | Smith |
| 1,179,768 A | 4/1916 | Simmons |
| 1,249,826 A | 12/1917 | Putnam |
| 1,257,411 A | 2/1918 | Sherman |
| 1,295,792 A | 2/1919 | Putnam |
| 1,591,501 A | 2/1919 | Allison |
| 1,380,926 A | 6/1921 | Putnam |
| 1,410,986 A | 3/1922 | Bellamore |
| 1,730,872 A | 12/1922 | Baker |
| 1,470,626 A | 10/1923 | Kranz |
| 1,583,222 A | 5/1926 | Coates |
| 1,585,401 A | 5/1926 | Main |
| 1,591,003 A | 6/1926 | Vincent |
| 1,603,177 A | 10/1926 | Wilhelms |
| 1,611,975 A | 12/1926 | Williams |
| 1,627,953 A | 5/1927 | Buquet |
| 1,640,378 A | 8/1927 | Schoenthal |
| 1,652,653 A | 12/1927 | Whitcomb |
| 1,974,534 A | 6/1930 | Frank |
| 1,818,448 A | 8/1931 | Baker |
| 1,882,498 A | 10/1932 | Jarvis |
| 1,916,747 A | 7/1933 | Wagenhorst |
| 1,993,430 A | 3/1935 | Bell |
| 2,017,076 A | 10/1935 | Sauzedde |
| 2,046,205 A | 6/1936 | O'Neill |
| 2,115,092 A | 4/1938 | Weinberg |
| 2,182,560 A | 12/1939 | Higbee |
| 2,209,803 A | 7/1940 | Webb |
| 2,249,568 A | 7/1941 | Shinliver |
| 2,265,241 A | 12/1941 | Lyon |
| D132,028 S | 4/1942 | Davenport |
| 2,307,335 A | 1/1943 | Reddick |
| 2,464,348 A | 10/1946 | Roux |
| D158,227 S | 4/1950 | Sinclair |
| 2,551,783 A | 5/1951 | Ash |
| 2,584,309 A | 2/1952 | Voorhees |
| D171,011 S | 12/1953 | Rosenberg |
| 2,809,869 A | 10/1957 | Forbush et al. |
| 2,822,218 A | 2/1958 | Whitfield |
| 2,830,168 A | 4/1958 | Taylor |
| 2,963,326 A | 12/1960 | Wood |
| D190,640 S | 6/1961 | Hibbard |
| D190,641 S | 6/1961 | Hibbard |
| D190,642 S | 6/1961 | Hibbard |
| D190,644 S | 6/1961 | Hibbard |
| 3,006,692 A | 10/1961 | Schubert |
| 3,250,572 A | 3/1964 | Walker |
| 3,222,765 A | 12/1965 | Parent et al. |
| 3,570,093 A | 3/1971 | Gollwitzer |
| 3,601,450 A | 8/1971 | Baker |
| 3,612,614 A | 10/1971 | Ware |
| 3,865,170 A | 2/1975 | Mitchell |
| 3,974,870 A | 8/1976 | Watts |
| 3,995,676 A | 12/1976 | Casey |
| 3,999,588 A | 12/1976 | Mitchell |
| 4,145,079 A | 3/1979 | Greenfield et al. |
| RE30,436 E | 11/1980 | Casey |
| 4,280,426 A | 7/1981 | Swan |
| 4,345,360 A | 8/1982 | Ridout |
| 4,407,348 A | 10/1983 | Suckow |
| 4,466,670 A | 8/1984 | Kaji |
| 4,580,612 A | 4/1986 | Smithkey |
| 4,585,276 A | 4/1986 | Tirheimer |
| 4,643,484 A | 2/1987 | Luter et al. |
| 4,645,267 A | 2/1987 | Weld |
| 4,770,220 A | 9/1988 | Mori |
| 4,823,854 A | 4/1989 | Payne et al. |
| 4,856,849 A | 8/1989 | Fujii et al. |
| 4,997,235 A | 3/1991 | Braungart |
| 5,018,566 A | 5/1991 | Thoni |
| D318,449 S | 7/1991 | Lipper |
| 5,104,197 A | 4/1992 | Lipper |
| 5,215,137 A | 6/1993 | Weeks et al. |
| 5,292,182 A | 3/1994 | Kanazawa et al. |
| 5,295,304 A | 3/1994 | Ashley, Jr. |
| 5,301,728 A | 4/1994 | Brown, Jr. et al. |
| 5,345,676 A | 9/1994 | Ashley, Jr. |
| 5,380,071 A | 1/1995 | Kier, Jr. |
| 5,417,476 A | 5/1995 | Hasegawa et al. |
| 5,429,422 A | 7/1995 | Baldi |
| 5,435,629 A | 7/1995 | Suzuki |
| 5,515,709 A | 5/1996 | Lowe et al. |
| 5,533,260 A | 7/1996 | Kier, Jr. |
| 5,620,235 A | 4/1997 | Janus |
| 5,634,271 A | 6/1997 | Lipper |
| 5,694,687 A | 12/1997 | Coleman |
| 5,722,734 A | 3/1998 | Bennick |
| 5,772,801 A | 6/1998 | Baldi et al. |
| D398,894 S | 9/1998 | Kelley |
| 5,829,843 A | 11/1998 | Eikhoff |
| 5,899,537 A | 5/1999 | Abe et al. |
| 5,951,114 A | 9/1999 | Marron et al. |
| 6,024,415 A | 2/2000 | Stach |
| 6,073,347 A | 6/2000 | Cvijanovic et al. |
| 6,193,321 B1 | 2/2001 | Cvijanovic et al. |
| 6,302,493 B2 | 10/2001 | Zemlicka |
| 6,312,033 B1 | 11/2001 | Engstler |
| 6,325,462 B1 | 12/2001 | Hummel et al. |
| 6,332,653 B1 | 12/2001 | Shimizu et al. |
| 6,354,667 B1 | 3/2002 | Cochran et al. |
| 6,457,501 B1 | 10/2002 | Ball |
| 6,473,967 B1 | 11/2002 | Coleman et al. |
| 6,502,308 B1 | 1/2003 | Carfora et al. |
| 6,547,341 B1 | 4/2003 | Griffin |
| 6,568,765 B1 | 5/2003 | Augier |
| 6,595,595 B1 | 7/2003 | Hui |
| 6,598,939 B2 | 7/2003 | Müller |
| 6,623,086 B1 | 9/2003 | Goodman |
| D503,369 S | 3/2005 | Kato |
| 6,869,149 B2 | 3/2005 | Tanaka |
| 6,916,072 B2 | 7/2005 | Bernoni |
| RE38,779 E | 8/2005 | Lovitt |
| 7,264,316 B2 | 9/2007 | DiMarco et al. |
| 7,270,382 B2 | 9/2007 | Hodges et al. |
| 7,452,036 B1 | 11/2008 | Sulahian |
| 7,452,037 B1 | 11/2008 | Nunes |
| 7,703,859 B2 | 4/2010 | Hodges et al. |
| 2001/0026094 A1 | 10/2001 | Bhambra |
| 2002/0101112 A1 | 8/2002 | Gatton et al. |
| 2003/0209937 A1 | 11/2003 | Tanaka |
| 2004/0070259 A1 | 4/2004 | Chuang |
| 2005/0134108 A1 | 6/2005 | Chuang |
| 2005/0200193 A1* | 9/2005 | Hodges et al. ........... 301/63.101 |
| 2007/0062040 A1 | 3/2007 | Coleman et al. |
| 2007/0120415 A1 | 5/2007 | Kang |
| 2007/0278850 A1* | 12/2007 | Rodrigues ................ 301/63.103 |
| 2009/0026832 A1 | 1/2009 | Baumgartner |
| 2009/0039699 A1* | 2/2009 | Liao .......................... 301/95.11 |
| 2009/0278398 A1 | 11/2009 | Diko |
| 2011/0018334 A1* | 1/2011 | Ruff ........................... 301/37.24 |
| 2011/0018335 A1 | 1/2011 | Hodges |

FOREIGN PATENT DOCUMENTS

| | | |
|---|---|---|
| EP | 0 427 607 | 5/1991 |
| EP | 1 175 304 | 1/2002 |
| EP | 1 792 748 | 6/2007 |
| GB | 2 080 212 | 2/1982 |
| JP | 62-096101 | 5/1987 |
| JP | 04-321401 | 11/1992 |
| WO | WO 84/01747 | 5/1984 |
| WO | WO 01/54924 | 8/2001 |

* cited by examiner

WHEEL WITH INCREASED INTERIOR LIP DEPTH

CROSS-REFERENCE TO RELATED APPLICATIONS

This application claims the benefit of U.S. Provisional Application No. 61/257,438 filed on Nov. 2, 2009, the entirety of which is hereby incorporated by reference.

BACKGROUND OF THE INVENTION

1. Field of the Invention

The present disclosure relates generally to wheels for supporting vehicles, and in particular to wheels with an enhanced appearance.

2. Description of the Related Art

Consumers have increasingly sought to add style and distinctiveness to their vehicles by buying specially-designed wheels. Wheels with increased interior lip depth (e.g., the distance between the outboard edge of the wheel and the face of the central portion of the wheel) have been gaining in popularity. Also, larger-diameter wheels mounted within low-profile tires have been in high demand. However, certain wheel performance requirements relating primarily to load-bearing capabilities, comfort of ride, and positioning of the vehicle brakes and other functional components, have been viewed as severely limiting the size of the interior lip depth and the outboard wheel diameter, which in turn have placed rigid constrains on the design area and volume on the outboard side of the wheel. Moreover, the relatively small interior lip depth on traditional wheels has minimized the reflective effect of the central wheel face onto the generally shiny surface of the interior lip.

SUMMARY OF THE INVENTION

The various embodiments of the present disclosure have several features, no single one of which is essential or indispensable. A wheel configured to be mounted to a vehicle is disclosed. The wheel can include a wheel barrel extending from an outboard side of the wheel to an inboard side of the wheel. The wheel barrel can include a radially inner surface and can have a wheel barrel width extending from the outboard side of the wheel to the inboard side of the wheel. An inboard rim flange can be attached to the wheel barrel on the inboard side of the wheel. An outboard rim flange can be attached to the wheel barrel on the outboard side of the wheel. A register can extend radially inwardly from the radially inner surface of the wheel barrel. The wheel can include a wheel center piece that has a junction rim secured to the register, a center portion configured to attach to a vehicle, a plurality of spokes extending radially outwardly from the center portion, and a plurality of axial extensions that extend in a substantially inboard direction from radially outward ends of the spokes to the junction rim. A cavity can be defined between the inboard side of the wheel center piece and the inboard side of the wheel. In some embodiments, the cavity can have an axial width that is greater than about half the total wheel barrel width.

In some embodiments, the radially inner surface of the wheel barrel can include an interior lip having an interior lip depth extending from the outboard side of the wheel to the junction rim and, the interior lip can be substantially smooth. In some embodiments, the interior lip depth can be at least about half the total wheel barrel width.

In some embodiments, the cavity can be configured to accommodate braking components when attached to the front of a front wheel drive vehicle.

The wheel barrel can include an inner portion extending from the register to the inboard side of the wheel and an outer portion extending from the register to the outboard side of the wheel. The plurality of axial extensions can have a height that is greater than the axial width of the inner piece of the wheel barrel. In some embodiments, the axial extensions can have a height greater than or equal to about 3 inches. The axial extensions can have a height of at least about 4 inches. In some embodiments, the plurality of axial extensions can have a height that is greater than about half the axial width of the outer piece of the wheel barrel. The inner portion of the wheel barrel and the outer portion of the wheel barrel can be separately formed and secured together at the register.

An inboard side of the center portion of the wheel center piece can be positioned closer to the outboard side of the wheel than to the junction rim. The center portion of the wheel center piece can be positioned at about the same axial distance from the outboard side of the wheel as the outboard ends of the axial extensions.

In some embodiments, the axial extensions can intersect the spokes at an angle between about 100° and about 130°, or at an angle between about 110° and about 120°. In some embodiments, an angle taken between a line drawn from an outboard end of an axial extension to the junction rim and a line drawn from the outboard end of the axial extension to the center portion of the wheel center piece can be between about 80° and about 120°, can be between about 90° and about 110°, or can be about 90°. In some embodiments, the axial extensions can extend substantially parallel to inner surface of the wheel barrel.

In some embodiments, the interior lip can be tapered such that the interior lip has a first diameter near the outboard side of the wheel is larger than a second diameter near the junction rim. The axial extensions can be angled to extend substantially parallel to the interior lip such that the outboard ends of the axial extensions are positioned further radially outward than the inboard ends of the axial extensions.

In some embodiments, the wheel can include a wheel barrel extending from an outboard side of the wheel to an inboard side of the wheel, and the wheel barrel can have a radially inner surface. An inboard rim flange can be attached to the wheel barrel on the inboard side of the wheel. An outboard rim flange can be attached to the wheel barrel on the outboard side of the wheel. A register can extending radially inwardly from a location on the radially inner surface of the wheel barrel, and the register can be positioned closer to the inboard side of the wheel than to the outboard side of the wheel. The wheel can have a wheel center piece including a junction rim secured to the register, a plurality of axial extensions that extend from the junction rim in a substantially outboard direction to a location that is closer to the outboard side of the wheel than to the junction rim, a plurality of spokes extending radially inwardly from outboard ends of the axial extensions, and a center portion attached to the radially inner ends of the spokes. The center portion can be configured to attach to a vehicle.

The radially inner surface of the wheel barrel can include a substantially smooth interior lip extending from near the outboard side of the wheel to near the junction rim. The axial extensions can have a height such that they extend over more than half of the depth of the interior lip.

DETAILED DESCRIPTION OF THE PREFERRED EMBODIMENT

When mounted on a vehicle, a wheel has an "inboard" side that faces the interior of the vehicle and an "outboard" side that faces away from the vehicle. As used herein, a feature that extends "radially outwardly" extends from a point, line, or surface closer to the wheel's axis of rotation or symmetry to a point, line, or surface farther away from the wheel's axis of rotation. Conversely, a feature that extends "radially inwardly" extends from a point, line, or surface farther from the wheel's axis of rotation or symmetry to a point, line, or surface closer to the wheel's axis of rotation. Unless otherwise specified, when the disclosure discusses a distance from the inboard side of the wheel to a particular location, that distance is measured from a plane taken at the inboard side of the wheel along a line parallel to the axis of rotation to the particular location. Similarly, unless otherwise specified, when the disclosure discusses a distance from the outboard side of the wheel to a particular location, that distance is measured from a plane taken at the outboard side of the wheel along a line parallel to the axis of rotation to the particular location. In addition, as used herein, terms relating to circles and cylinders, such as "circular," "cylindrical," "diameter," "radius," and "concentric," are not limited to perfectly round structures. Rather, generally circular shapes, including those with large radial protrusions or indentations are also encompassed by these terms.

Figure 1:
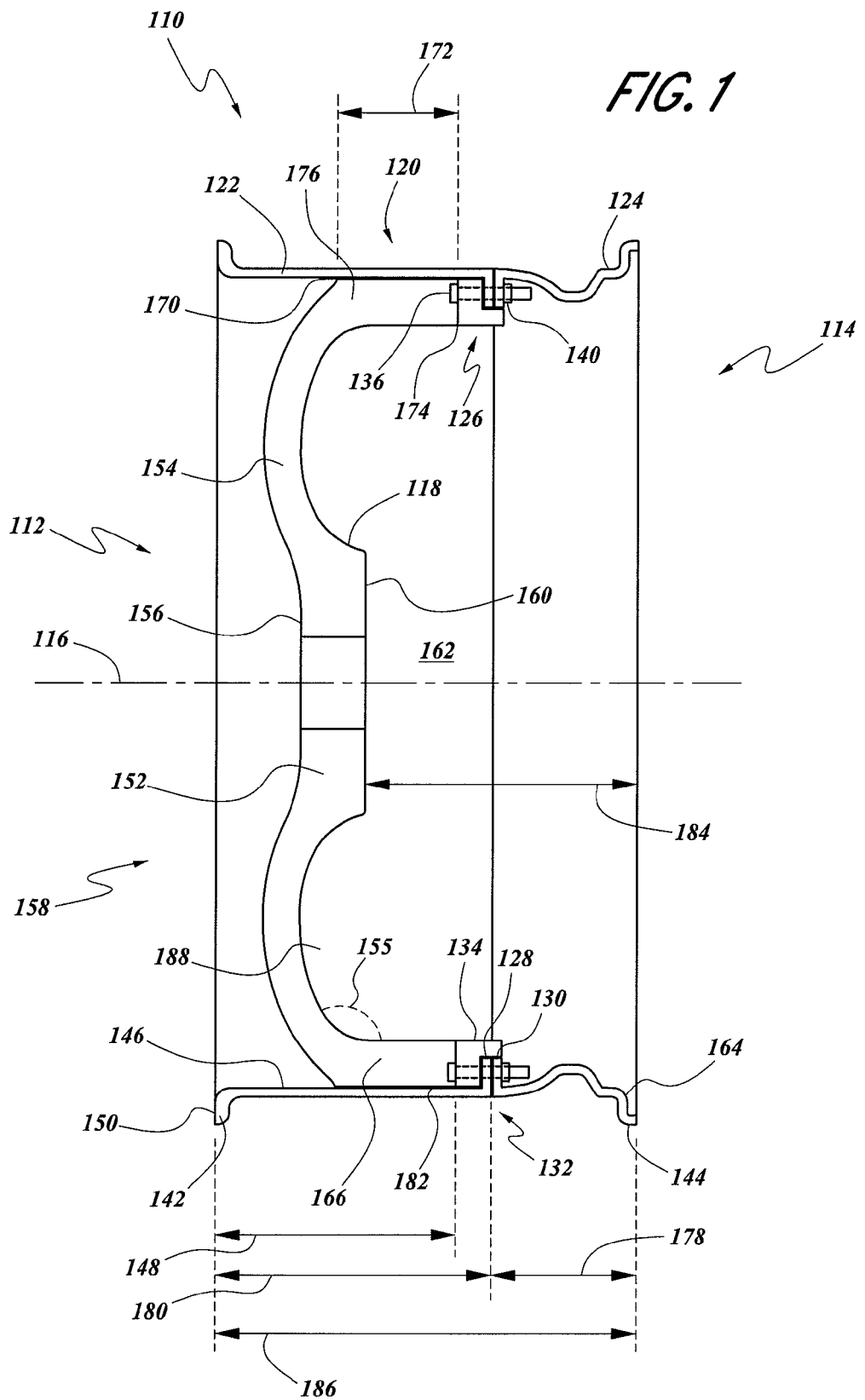
FIG. 1 is a cross-sectional view of a three-piece wheel having an increased interior lip depth.
Figure 2:
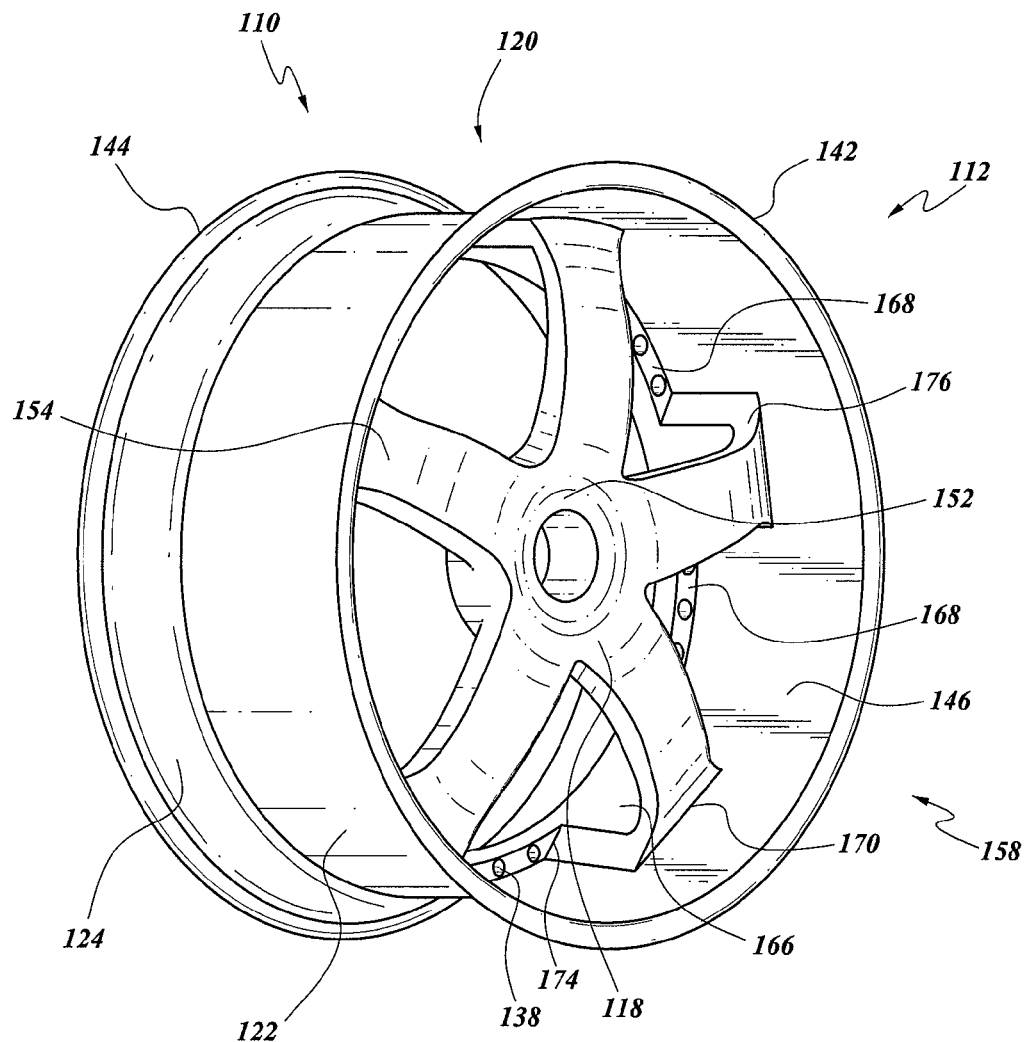
FIG. 2 is a front perspective view of the wheel of FIG. 1.
Figure 3:
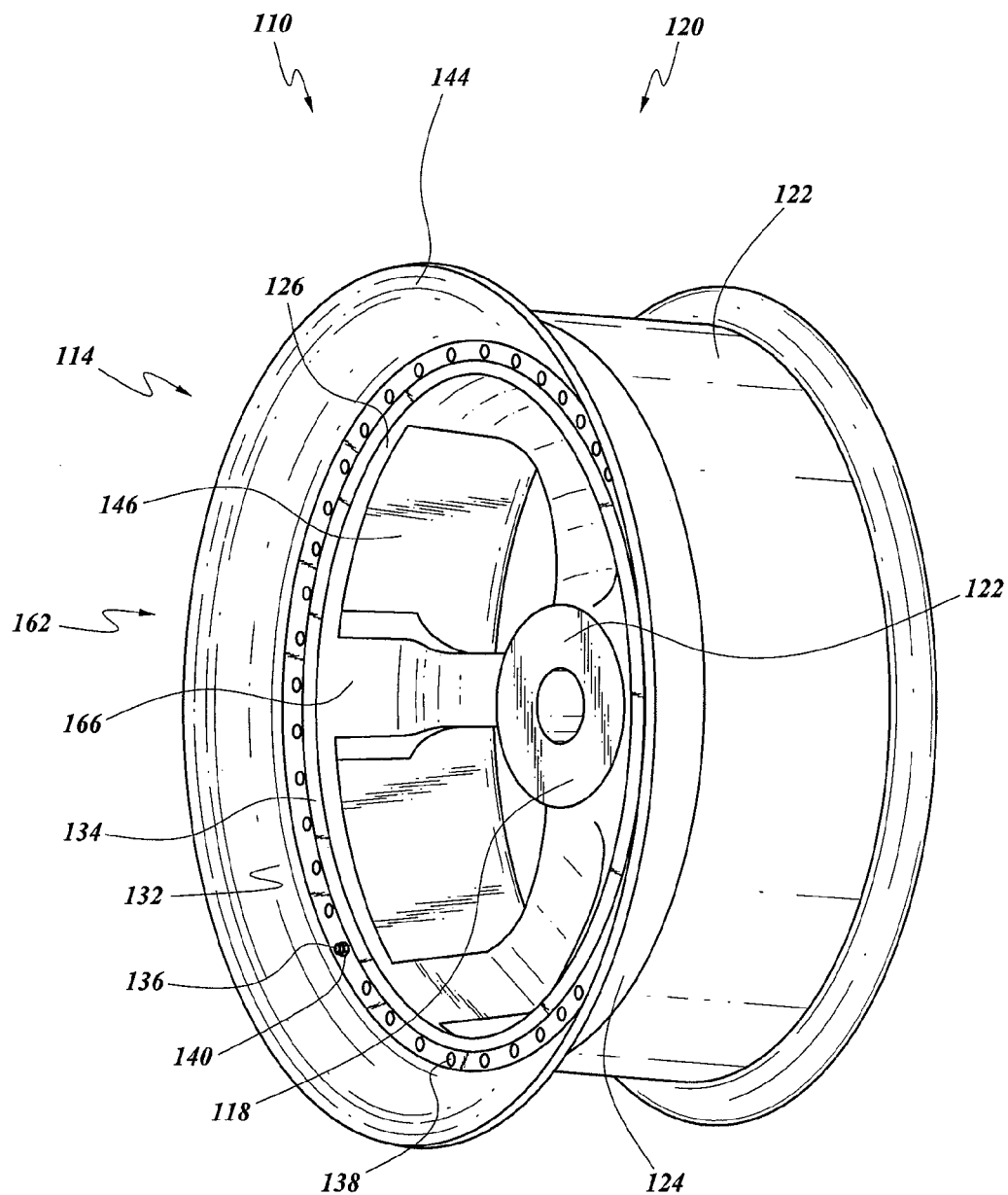
FIG. 3 is a rear perspective view of the wheel of FIG. 1.

FIG. 1 shows a cross-sectional view of a three-piece wheel 110. FIG. 2 shows a perspective view of the outboard side of the wheel 110. FIG. 3 shows a perspective view of the inboard side of the wheel 110. Although FIGS. 2 and 3 show an embodiment of a 5-spoke wheel, the cross section in FIG. 1 shows an embodiment in which the cross section intersects two oppositely extending spokes (e.g., a six spoke wheel). It will be understood that many different numbers of spokes and many different suitable spoke designs may compatible with the features herein described. It will also be understood that this disclosure includes non-limiting examples and the structures and methods can be interchanged and/or combined. For example, many of the structures illustrated on any particular one-piece, two-piece, or three-piece wheel can be used on any of the other wheels.

The wheel 110 has an outboard side 112 and an inboard side 114, and is generally rotationally symmetrical about an axis 116. The wheel 110 has a center piece 118 and a wheel barrel 120. The wheel barrel 120 can have an outer barrel piece 122 and an inner barrel piece 124. The outer barrel piece 122, inner barrel piece 124, and wheel center piece 118 can be joined together at a junction 126. The outer barrel piece 122 can include an outer junction rim 128, and the inner barrel piece 124 can include an inner junction rim 130. When the outer barrel piece 122 and inner barrel piece 124 are joined, the junction rims 128, 130 can form a register 132 to which the center piece 118 can be attached. The center piece 118 can include a center junction rim 134 which can be configured to fit onto the register 132 when the wheel 110 is assembled. The junction rims 128, 130, 134 can be held together by bolts 136 which extend through bores 138 formed in the junction rims 128, 130, 134. Nuts 140 can be fastened to the bolts 136 to secure the in center piece 118, the outer barrel piece 122, and the inner barrel piece 124 together. It will be understood that the center 118, outer barrel piece 122, and inner barrel piece 124 can be joined in other manners. For example, a suitable adhesive, a metal weld, or interlocking mechanical grooves and protrusions can be employed in the place of the illustrated bolts.

In some embodiments, the register 132 can be made up of only the outer junction rim 128, and the inner piece 124 can be welded or otherwise attached to the outer piece 122 by other than the bolts 136. Other variations are also possible. In some embodiments, the outer junction rim 128, the inner junction rim 130, and/or the center junction rim 134 can be separated into sections, rather than extending fully around a circumference. Thus, in some cases there may be gaps (not shown) in which the outer junction rim 128, the inner junction rim 130, and/or the center junction rim 134 do not extend radially inwardly.

When assembled, the wheel barrel 120 can be approximately cylindrical in shape and can be generally rotationally symmetrical about an axis of symmetry 116. An outboard rim flange 142 can extend radially outwardly from the outboard edge of the wheel barrel 120 away from the axis 116. Similarly, an inboard rim flange 144 can extend radially outwardly from the inboard edge of the wheel barrel 120 away from the axis 116. The outboard, axis-facing (interior) surface of the wheel barrel 120 can form an interior lip 146. The interior lip 146 can have an interior lip depth 148, which in some embodiments can be defined as the distance along a line parallel to the axis 116 from the outboard edge 150 of the wheel 110 to the center junction rim 134. The interior lip 146 can provide a reflective surface in which elements of the wheel center 118 can be seen by a viewer at the outboard side 112 of the wheel 110.

The radially inwardly facing surface of the wheel barrel 120 (e.g., the surface forming the interior lip 146) can form a generally cylindrical shape wherein the diameter of the inner surface of the wheel barrel is substantially the same when taken near the outboard side 112 of the wheel as when taken near the junction 126 or at any location therebetween. In some embodiments, the interior surface of the wheel barrel 120 can be tapered thereby forming a substantially frustoconical surface as described below.

Figure 4:
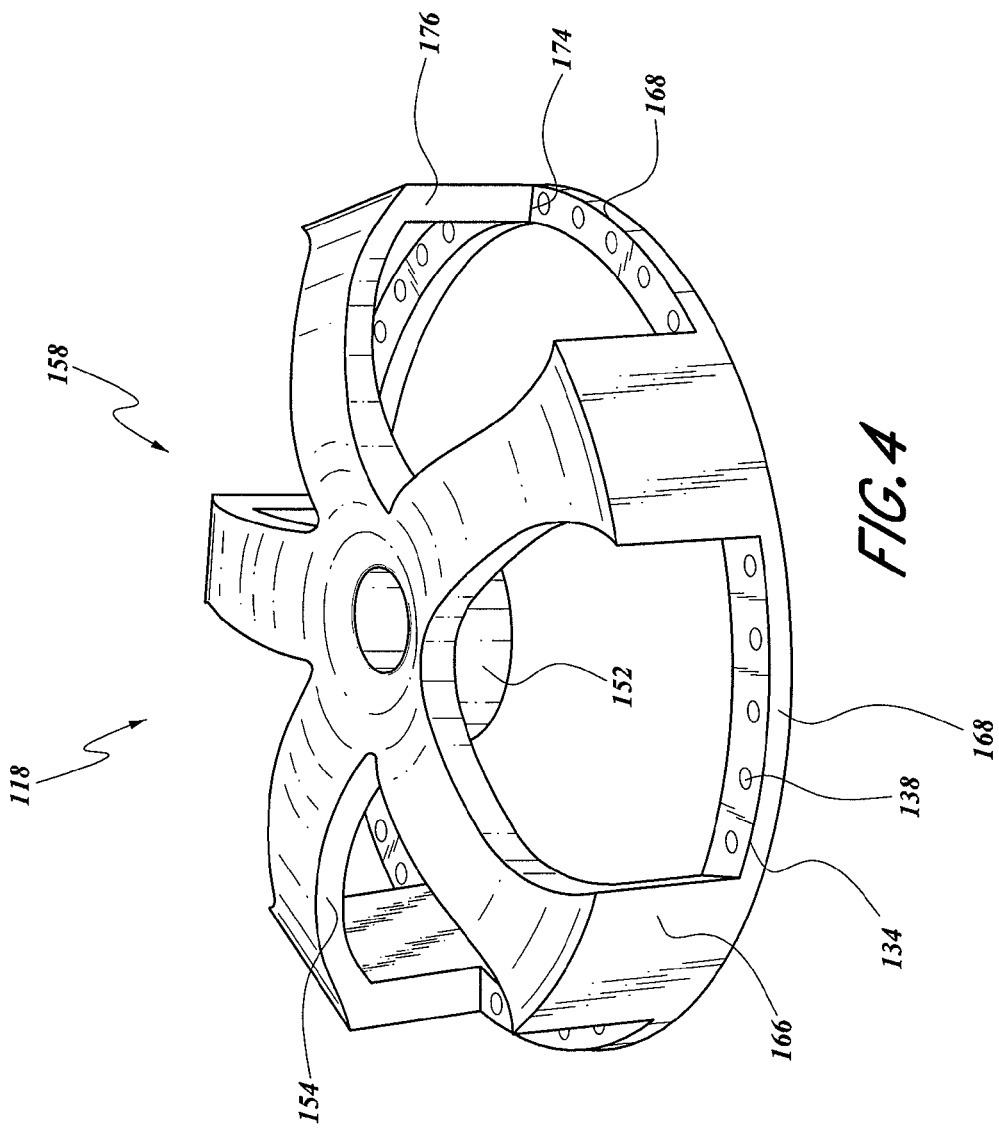
FIG. 4 is a perspective view of a wheel center piece.

FIG. 4 shows a perspective view of the wheel center piece 118. With reference now to FIGS. 1-4, the wheel center piece 118 can include a center portion 152 configured to attach to a vehicle (e.g., to an axle or transaxle) via lug nuts or other suitable manner. The wheel center piece 118 can also include a plurality of spokes 154 extending radially outwardly from the wheel center piece 118 toward the wheel barrel. The center piece 118 can have an outboard side 156 having a face design 158, and an inboard side 160. The wheel 110 can define a cavity 162 between the inboard side 160 of the center piece 118 and the inboard edge 164 of the wheel 110.

Generally flat, disk-shaped wheel centers, combined with the presence of mechanical components adjacent to the wheel axle, have traditionally caused other limitations on volume and surface area available for design within multi-piece wheels. For example, in certain vehicles, especially frontwheel-drive vehicles with a significant outboard offset on the brake components, it is very difficult to produce an interior lip of significant size because the volume requirements for the mechanical components on the inboard side of the wheel center piece are too great. Typically, the cavity formed between the inboard surface of the wheel center piece and the inboard edge of the wheel is used to enclose the various mechanical components clustered near the vehicle axle (or transaxle). Accordingly, the junction has traditionally been located relatively near the outboard side of the wheel to produce a cavity with sufficient volume to accommodate the mechanical components.

The wheel center piece 118 can include axial extensions 166 which attach the spokes 154 to the center junction rim 134. As can be seen in FIG. 2, the center junction rim 134 can be separated by the axial extensions 166 into distinct rim portions 168, where each rim portion 168 extends between adjacent axial extensions 166. The spokes can extend radially outwardly so that they appear to be connected to the interior surface of the wheel barrel 120 at a location 170 that is near the outboard end of the axial extensions 166, when in reality the spokes 154 are secured to the wheel barrel 120 by the axial extensions 166 and the center junction rim 134. The axial extensions 166 allow the register 132 to be located relatively nearer the inboard side 114 of the wheel 110 while providing a cavity 162 with volume sufficient to accommodate the mechanical components (e.g., braking components) of the wheel axel (or transaxle), thereby producing an increased interior lip depth 148.

In some embodiments, a gap 182 can be formed between the axial extensions 166 and the interior surface of the wheel barrel 120 when the wheel 110 is assembled. In some embodiments, the gap 182 can be at least about 1 mm and/or less than or equal to about 5 mm, although gap sizes outside these ranges can be used. In some embodiments, at least a portion of the radially outward surface of the axial extensions 166 can contact the interior surface of the wheel barrel 120 when the wheel 110 is assembled. In some embodiments, the axial extensions 166 can extend substantially parallel to the interior surface of the wheel barrel 120 that lies adjacent to the axial extensions 166.

The axial extensions 166 can have a height 172 measured from the point 174 where the axial extensions 166 attach to the center junction rim 134 to the point 176 where the axial extensions 166 attach to the spokes 154. In some embodiments, the height 172 of the axial extensions 166 can be at least about 3 inches and/or less than or equal to about 6 inches. In some embodiments, the axial extensions 166 can have a height 172 of at least about 4 inches. Other heights 172 can be used for the axial extensions 166. For example, if the cavity 162 requires additional volume, the axial extensions 166 can be lengthened, thereby positioning the spokes 154 and the center portion 152 of the wheel center 118 closer to the outboard side 112 of the wheel 110. In some embodiments, the outboard end of the axial extensions can be positioned near the outboard side of the wheel. Conversely, if the less volume is required for the cavity 162 or if the register is shifted more towards the outboard side 112 of the wheel 110, the height 172 of the axial extensions 166 may be reduced. In some instances the axial extensions 166 may have a height 172 of about 2 inches. Other variations are possible.

In some embodiments, the axial extensions 166 can have a height 172 that positions the point 176 where the axial extensions 166 attach to the spokes 154 at about the midpoint of the interior lip 146, or at a location closer to the outboard side 112 of the wheel 110 than the midpoint of the interior lip 146, or at a location closer to the outboard side 112 of the wheel 110 than the inboard side 114 of the wheel 110. In some embodiments, the height 172 of the axial extensions 166 can be greater than the axial width 178 of the inner piece 124 of the wheel barrel 120, or greater than about half the axial width 180 of the outer piece 122 of the wheel barrel 120. In some embodiments, both the axial width 184 of the cavity 162 and the interior lip depth 148 are both greater than about half the total axial width 186 of the wheel 110, thereby providing a relatively deep interior lip depth 148 while also providing a cavity 162 of sufficient volume to accommodate the mechanical components (e.g., brakes).

In some embodiments, the spokes 154 can be configured to effectively extend substantially perpendicular to the axis 116 such that the center portion 152 of the wheel center piece 118 is positioned axially about even with the point 176 where the axial extensions 166 attach to the spokes 154. The spokes 154 can be curved such that they are convex when viewed from the outboard side, thereby adding additional volume 188 to the cavity 162. In some embodiments, the axial extensions 166 intersect the spokes 154 at an angle 155 of at least about 100° and/or less than or equal to about 130°, or more particularly at an angle 155 of at least about 110° and/or less than or equal to about 120°.

Figure 5:
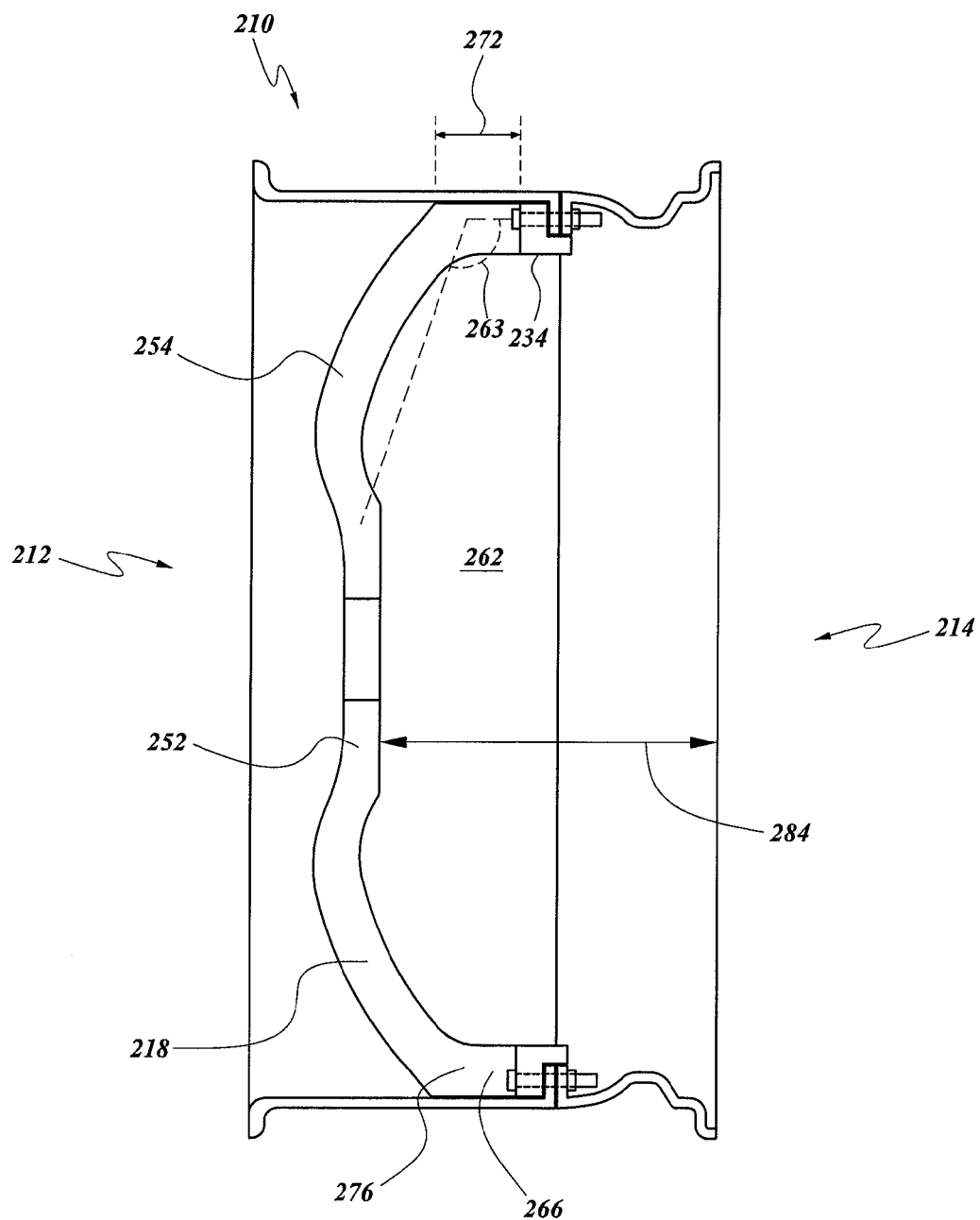
FIG. 5 is another embodiment of a three-piece wheel having an increased interior lip depth.

Turning now to FIG. 5, a cross-sectional view of a three-piece wheel 210 is shown which can be similar to, or the same as, the wheel 110 discussed above, or any other wheel disclosed herein, in many respects. The wheel 210 can have spokes 254 that are angled toward the outboard side 212 of the wheel 210, thereby positioning the center portion 252 of the wheel center 218 closer to the outboard side 212 of the wheel 210 than the point 276 where the axial extensions 266 attach to the spokes 254. In the embodiment shown in FIG. 6, the axial extensions 266 can have a height 272 that is less than the height 172 discussed above in connection with the wheel 110 because the angled spokes 254 increase the axial width 284 of the cavity 262. In some embodiments, the height 272 of the axial extensions 266 can be at least about 2 inches and/or less than or equal to about 4 or 6 inches, although heights outside these ranges can also be used.

It will be understood that the by varying the angle at which the spokes 254 extend from the axial extensions 266 to the center portion 252, the height 272 of the axial extensions 266 can vary without changing the location of the center portion 252 where the wheel 210 attaches to the vehicle. In some embodiments, an angle 263 taken between a line drawn from an outboard end of an axial extension 266 to the center junction rim 234 and a line drawn from the outboard end of the axial extension 266 to the center portion 252 of the wheel center piece 218 can be at least about 80° and/or less than or equal to about 120°. The angle 263 can be at least about 90° and/or less than or equal to about 110°.

Figure 6:
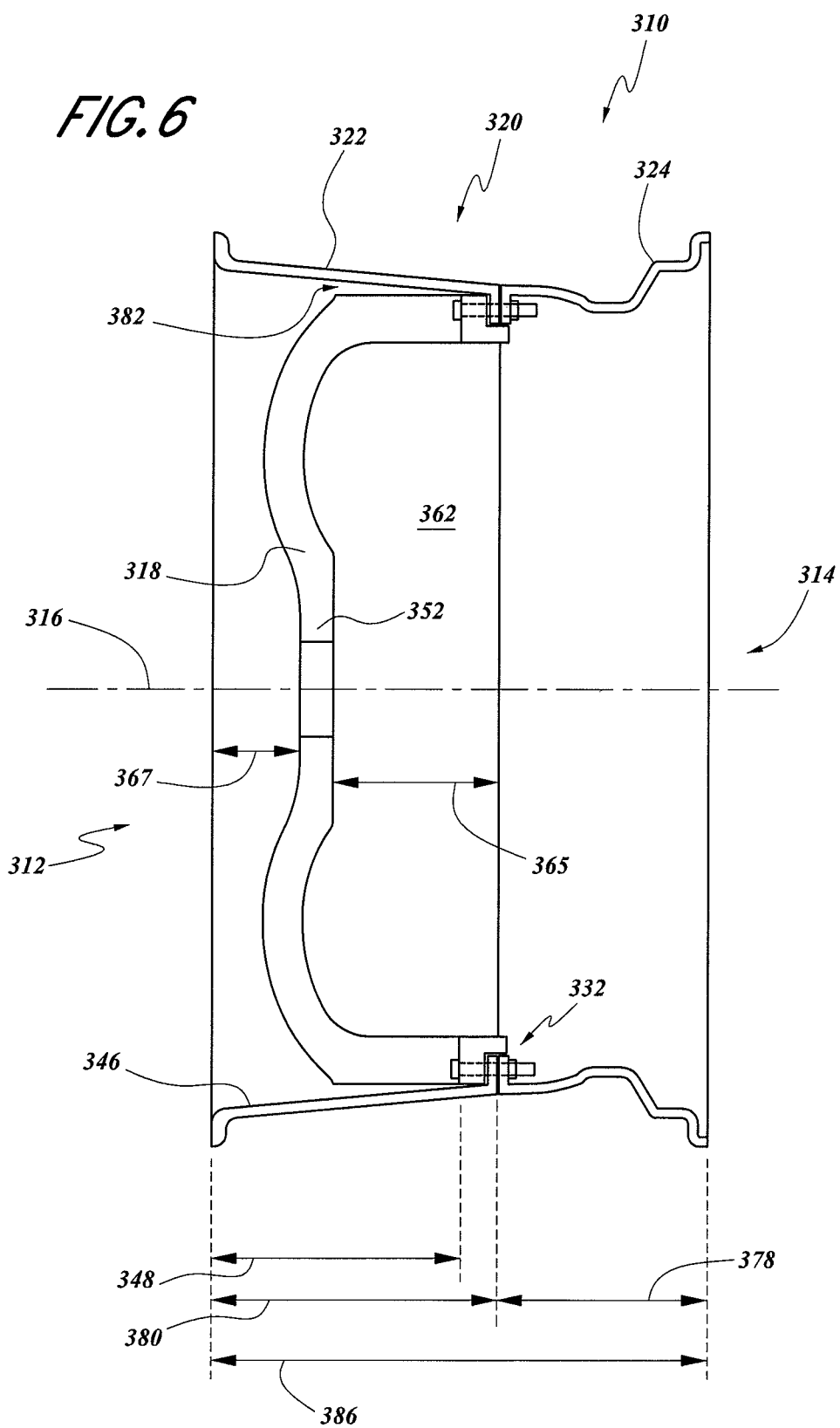
FIG. 6 is another embodiment of a three-piece wheel having an increased interior lip depth.

FIG. 6 shows a cross sectional view of another example embodiment of a three-piece wheel 310 having an increased interior lip depth. The wheel 310 can be similar to, or the same as the wheel 110, or any other wheel disclosed herein in many respects. The wheel 310 can include a wheel center piece 318, and a wheel barrel 320 having an inner barrel piece 324 and an outer barrel piece 322.

In the embodiment shown in FIG. 6, the inner barrel piece 324 has an axial width 378 that is longer than the wheel 110 shown in FIG. 1. In some cases, the same wheel center 318 and outer barrel piece 324 can be attached to different inner barrel pieces 322 of different width to provide wheels that are configured to accommodate various tire widths. Thus, a line of wheels can be made to accommodate a variety of tire widths by making various inner barrel pieces 324 of different axial widths and only one size of outer barrel piece 322 and wheel center 318, thereby allowing for more efficient manufacturing. In some embodiments, the inner barrel piece 324 can be relatively narrow, and wider tires can be accommodated by forming an outer barrel piece 322 with a wider axial width 380. A wider outer barrel piece 322 can allow for an even deeper interior lip depth 348. In some embodiments, the inner barrel piece 324 is manufactured with as small an axial width as possible (e.g., less than or equal to about 2, 3, or 4 inches) to thereby maximize the potential depth 348 of the interior lip 346.

In the embodiment shown in FIG. 6, the axial width 380 of the outer barrel piece 322 is larger than the axial width 378 of the inner barrel piece 324, thereby positioning the register 332 closer to the inboard side 314 of the wheel than to the outboard side of the wheel 312. In some embodiments, the inner barrel piece 324 and outer barrel piece 322 can have axial widths 378, 380 that are substantially the same, or the axial width 378 of the inner barrel piece 324 can be greater than the axial width 380 of the outer barrel piece 322 so long as the outer barrel piece 322 is wide enough to form an aesthetically pleasing interior lip 346 having a relatively deep interior lip depth 348 (e.g., measured from the outboard side 312 of the wheel 310 to the outboard side of the central junction rim 334) as compared to non-deep lip wheels. In some embodiments, the interior lip depth 348 can be about the same as half the total axial width 386 of the wheel 310, and can be less than half the total axial width 386 in some cases.

Although many embodiments disclosed herein describe the interior lip and as being substantially flat and smooth, it will be understood that the interior lip can include grooves, patterns, writing, raised ridges, or other designs to form an aesthetically pleasing appearance on the interior lip of the wheel. Because of the relatively large depth 348 of the interior lip 346, a large area can be available for forming designs on the interior lip 346, thereby allowing a high degree of customization available to consumers. In some embodiments, at least a portion of the interior lip 346 can be reflective.

In the embodiment shown in FIG. 6, the interior lip 346 can be tapered to form a generally frustoconical shape, such that a diameter of the interior lip 346 taken near the outboard side 312 of the wheel 310 is greater than a diameter of the interior lip 346 taken near the central junction rim 334. U.S. Pat. No. 7,270,382 (the "'382 Patent") describes additional details relating to a tapered interior lip. The entirety of the '382 Patent is hereby incorporated by reference into this specification for all that it discloses. Additional details disclosed in the '382 patent can also be used with or incorporated into the wheels disclosed herein.

The axial extensions 366 can extend substantially parallel to the axis of rotation 316 such that a gap 382 of varying height is formed between the radially outer surface of the axial extensions 366 and the inner surface of the wheel barrel 320. The gap 382 can have a first height near the central junction rim 334 that is less than a height near the outboard end of the axial extension 366. Thus, as the tapered interior lip 346 tapers away from the axial extension 366, the gap 382 widens in the outboard direction. Alternatively, the axial extensions 366 can be angles slightly outwardly such that the axial extensions 366 extend substantially parallel to the tapered interior lip 346. In some cases, no gap 382 is formed, and the axial extensions can contact the wheel barrel 320.

The wheel 310 can be configured to provide a cavity 362 (formed between the inboard side of the wheel center 318 and the inboard side of the wheel 314) that is large enough to accommodate the braking components or other mechanical components on an axle or transaxle of a vehicle (e.g., on a front wheel of a front-wheel-drive vehicle). In some embodiments, the inner barrel piece 324 can comprise pieces of various widths, permitting the center portion 352 of the wheel center piece 318 in some embodiments to be positioned closer to the outboard side of the wheel 312 than to the inboard side of the outer barrel piece 322, to provide a large cavity 362 height. A distance 365 measured from the inboard side of the center piece 318 to the inboard side of the outer barrel piece 322 can be equal to or greater than about half the axial width of the outer barrel piece 322. The distance 365 can be greater than the distance 367 measured from the outboard side of the center portion 352 to the outboard side 312 of the wheel 310, and in some cases the distance 365 can be more than double the distance 367. Thus, the central portion 352 can attach to the vehicle generally near the outboard side 312 of the wheel (thereby providing sufficient cavity volume to accommodate the brakes and other mechanical components), while also provided a deep interior lip 346.

Figure 7:
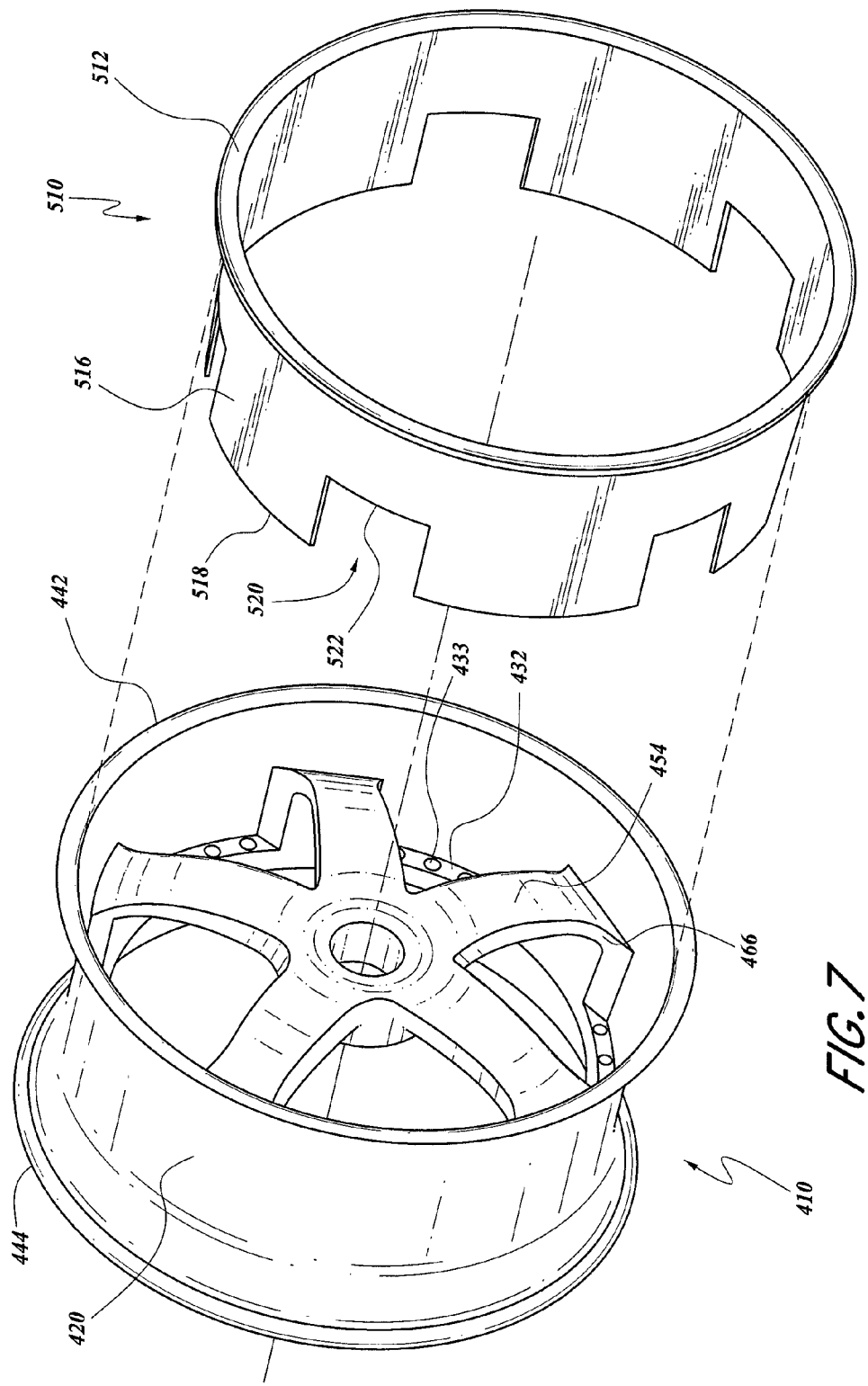
FIG. 7 is a perspective view of an embodiment of a one-piece wheel and a wheel component covering insert.
Figure 8:
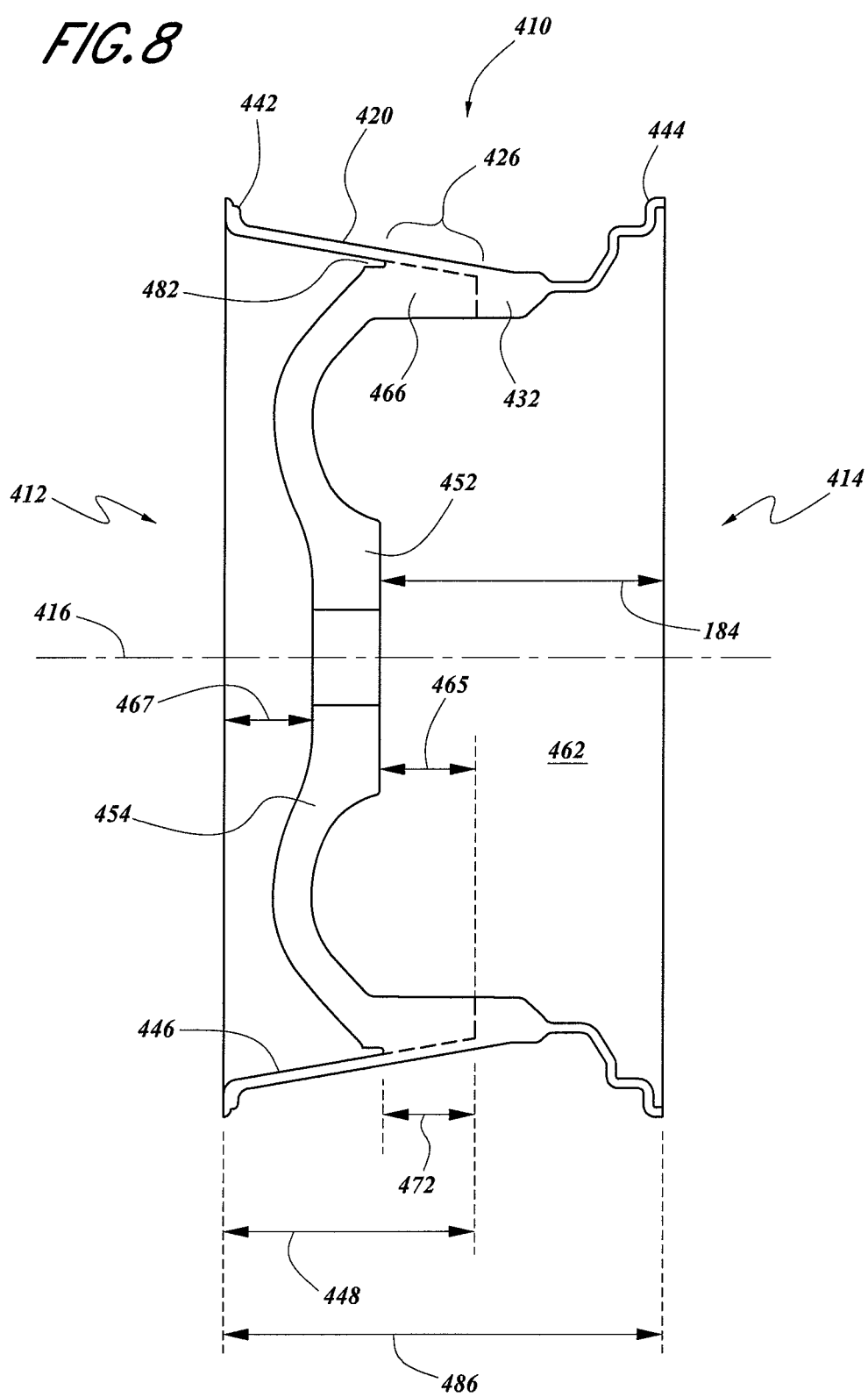
FIG. 8 is a cross sectional view of the wheel of FIG. 7.
Figure 9:
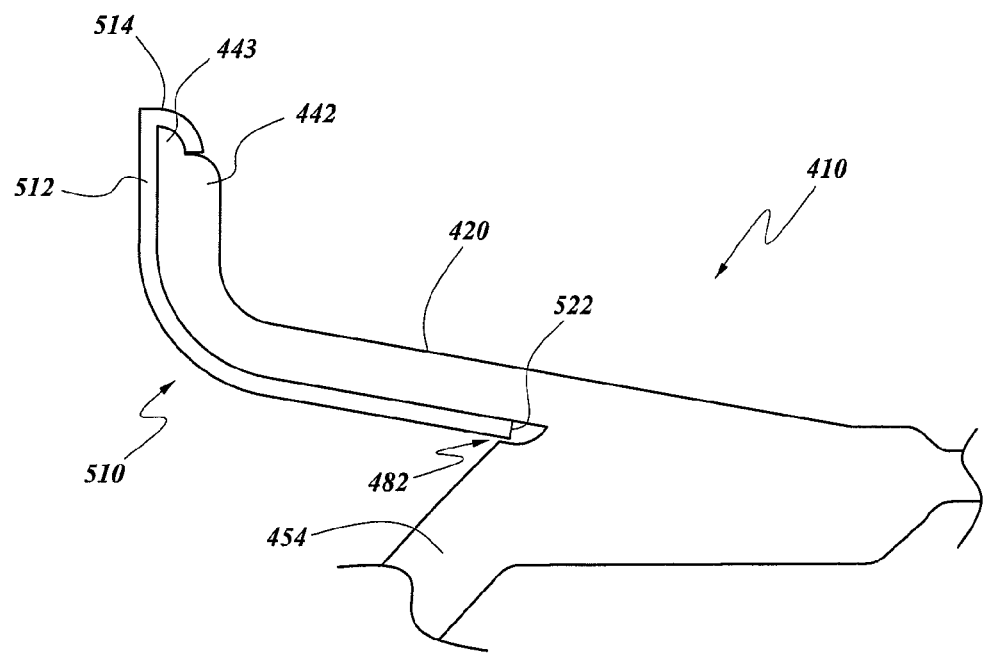
FIG. 9 is a partial cross sectional view of the wheel and insert of FIG. 7.
Figure 10:
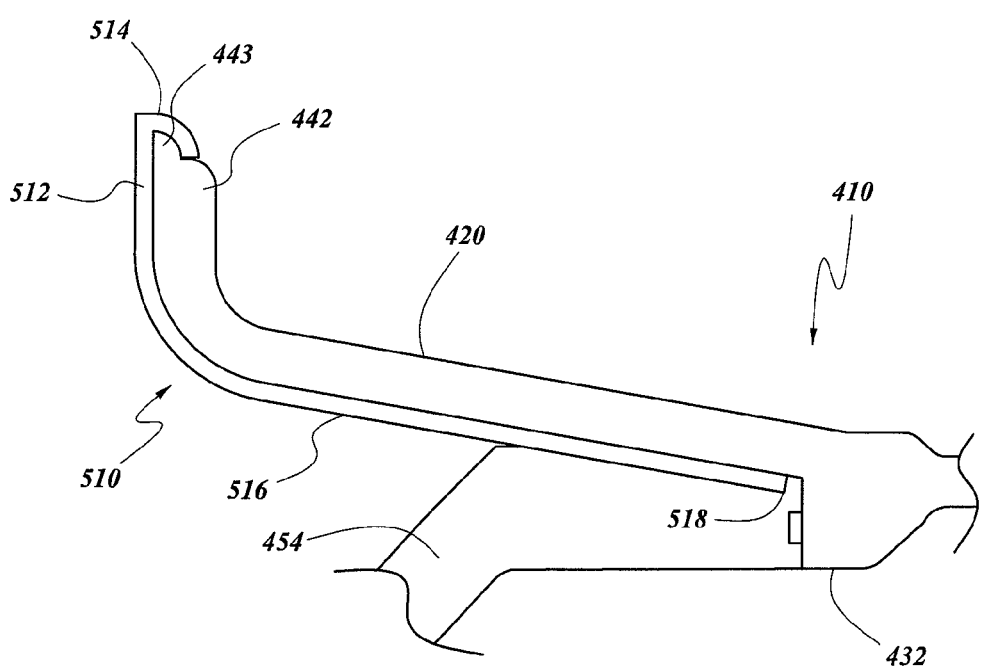
FIG. 10 is another partial cross sectional view of the wheel and insert of FIG. 7.

Turning now to FIGS. 7-10, a one-piece wheel 410 can be configured to have the appearance of being a multi-piece wheel having a deep interior lip 446 and a large cavity volume 462. FIG. 7 is a perspective view of the wheel 410 and an insert wheel component covering 510. FIG. 8 is a cross sectional view of the wheel 410, and FIGS. 9 and 10 are detailed cross sectional views of the wheel 410 and the insert 510.

The wheel barrel 420 can have an inboard rim flange 344 and an outboard rim flange 342. The rim flanges 342, 344 can be configured to receive a tire (not shown) mounted onto the wheel 410. The wheel 410 can be rotatable about an axis of rotation 416. A center portion 452 of the wheel 410 can be configured to attach to a vehicle (e.g., using lug nuts) and can be positioned so as to provide a cavity 462 sufficiently large to accommodate brake components or other mechanical components associated with the axel or transaxle of a vehicle. The cavity 462 can provide sufficient volume for the wheel 410 to be mounted onto the front of a front-wheel-drive vehicle. A plurality of spokes 454 can extend from the center portion 452 to the wheel barrel 420 and can attach to the wheel barrel 420 at a junction 426. Various numbers of spokes 454 and spoke designs can be used. The wheel barrel 420, spokes 454, and center portion 452 can all be integrally formed (e.g., molded), thereby forming a one-piece wheel.

A register 432 can extend radially inwardly from the inner surface of the wheel barrel 420. The register 432 can have a series of bolts 433 attached thereto to give the register 432 the appearance a central junction rim is attached thereto. Thus, the one-piece wheel 410 can provide the appearance that the spokes 454 and center portion 452 are formed as a separate piece than the wheel barrel 420 (as in a multi-piece wheel).

Axial extensions 466 can extend from the outboard ends of the spokes 454 to the register 432. In some embodiments, the radially inner surface of the axial extensions 466 can align substantially parallel with the axis of rotation 416, and the radially outer surface of the axial extensions 466 can attach to, and be integrally formed with, the inner surface of the wheel barrel 420. Thus, the junction 426 that attaches the spokes to the wheel barrel 420 can extend from the point nearest the outboard side 412 of the wheel 410 where the spokes 454 attach to the wheel barrel 420 back to the register 432.

In some embodiments, the register 432 and the axial extensions 466 do not provide any substantial structural support of functional purpose, but rather serve to provide the appearance that the one-piece wheel 410 is a multi-piece wheel wherein the spokes do not attach directly to the wheel barrel and instead attach to the register via the axial extensions. In some embodiments, the register 432 and/or the axial extensions 466 can provide additional structural support to the wheel. In some embodiments, the radially outer surface of the wheel barrel 420 can include indentations (not shown) corresponding to the locations of the axial extensions 466 and/or the location of the register, thereby allowing the thickness of the wheel barrel to be generally uniform instead of being significantly thicker at the regions having the register 432 and axial extensions 466. Thus, structural integrity can be maintained while reducing the amount of materials required to form the wheel 410.

A groove 482 can be formed at the radially outer end and outboard side of the spokes 454. The groove can reinforce the appearance that the spokes 454 are not attached directly to the wheel barrel 420 by concealing the location where the spokes 454 do connect to the wheel barrel 420. Thus, upon casual inspection it may appear that a gap is located between the wheel barrel 420 and the axial extensions 466 and spokes 454.

The interior surface of the wheel barrel 420 can include an interior lip 446 that extends from the outboard side of the wheel to the outboard side of the register 432. The interior lip 446 can be substantially smooth, or it can have grooves, ridges, or other designs thereon. The interior lip 446 can be reflective. The interior lip 446 can be tapered to form a generally frustoconical shape, wherein a diameter of the interior lip 446 taken near the outboard side 412 of the wheel 410 is larger than a diameter of the interior lip 446 taken near the register 432. The interior lip 446 can have an interior lip depth 448 that is large compared to non-deep lip wheels. For example, the interior lip depth 448 can be at least as large as half the total axial width 486 of the wheel 410. In some embodiments, no insert 510 is applied to the wheel 410, and the inner surface of the barrel 420 makes up the visible surface of the interior lip 446.

The cavity height 184 can be larger than half the full axial width 486 of the wheel 410, to thereby provide sufficient volume to accommodate mechanical components of the vehicle (e.g., brakes). The height 472 of the axial extensions 466 can be greater than about 1 inch, greater than about 2 inches. In some embodiments, the height 472 can be about 3 inches, 4 inches, 6 inches, or any other suitable distance for displacing the location where the spokes 454 intersect the wheel barrel 420 toward the outboard direction, thereby increasing the cavity height 184 sufficiently to accommodate the vehicle's mechanical components. In some embodiments, the axial distance 465 between the plane on which the outboard side of the register 432 lies and the inboard side of the center portion 452 can be at least as large as the axial distance 467 between the outboard side of the center portion 452 and the outboard side of the wheel 410.

FIG. 7 shows the wheel 410 and the wheel component covering insert 510 in a disengaged configuration. FIGS. 9 and 10 show partial cross sections of the wheel 410 and insert 510 in an engaged configuration. The wheel component covering insert 510 can includes an outboard portion 512 configured to secure to the outboard rim flange 442 of the wheel 410. The outboard portion 512 can be curved to generally follow the curvature of the outboard rim flange 442. As can be seen in FIGS. 9 and 10, the outboard rim flange 442 can include a ridge 443 configured to receive a hook-shaped portion 514 located at the end of the outboard portion 512. When the insert 510 is inserted into the outboard side of the wheel 410, the hook-shaped portion 514 can snap onto the ridge 443 to secure the insert 510 to the wheel 410. Alternatively, the end of the outboard portion 512 can be crimped down of the ridge 443 to secure the insert 510 to the wheel 410. Other attachment structure may be used. For example, the outboard rim flange 442 can include a groove or slot and the outboard portion 512 of the insert 510 can include a piece configured to fit into the groove or slot to secure the insert 510 to the wheel 410.

A lip portion 516 can extend in the inboard direction from the outboard portion 512. The lip portion 516 can be generally smooth and can be reflective, or it can include grooves, ridges, or other designs. The lip portion 516 can extend substantially parallel to the radially inner surface of the wheel barrel 420. In some embodiments, a small gap (not shown) can be formed between the lip portion 516 and the wheel barrel 420. In some embodiments, the lip portion 516 can abut against the wheel barrel. In some embodiments, an adhesive can be used between the insert 510 and the wheel barrel 420 to aid in securing the insert 510 to the barrel 420.

A plurality of gaps 520 can be located in the inboard end of the lip portion 516, and the gaps 520 can be shaped to receive the spokes 454 and axial extensions 466 therein. FIG. 9 is a cross sectional view taken at a plane that intersects one of the gaps 420 and a spoke 454. FIG. 9 is a cross sectional view taken at a plane that passes through the space between gaps 520 and between spokes 454. As can be seen in FIG. 10, the inboard end 518 of the lip portion 516 can extend to a position adjacent to the outboard side of the register 432. In some cases, the inboard end 518 of the insert 510 can abut against the register 432, or a small gap may be formed therebetween. As can be seen in FIG. 9, the outboard end of the gap 522 can be positioned at a location adjacent to the furthest outboard point where the spokes 454 contact the wheel barrel 520. In some embodiments, a portion of the lip portion 516 can extend into the groove 482 that is formed at the radially outer end of the spoke 454.

Thus, in some embodiments, the insert 510 can appear to be an integral component of the wheel upon casual inspection. The one-piece wheel 410 can appeal to be a three-piece wheel in which the wheel barrel is made of two distinct pieces jointed together and wherein the spokes and center portion are formed as a distinct piece from the wheel barrel. Additional details and alternatives relating to the wheel component covering inserts, and which may be applied to the insert 510 are disclosed in U.S. patent application Ser. No. 12/840,972, the entirety of which is hereby incorporated by reference into this specification for all it discloses. It will be understood that in some embodiments, a wheel component covering insert (e.g., similar to or the same as 510) can be applied to a multi-piece wheel (e.g., 110, 210, or 310). In some embodiments, the wheel (e.g., wheel 410) can be used with no wheel component covering insert.

Various multi-piece wheel embodiments are described herein as having a wheel barrel that is formed of two pieces. These wheels are commonly called three-piece wheels and include a wheel center piece, an outer wheel barrel piece, and an inner wheel barrel piece. It will be understood that various wheels disclosed as three-piece wheels herein may alternatively be formed as two-piece wheels in which the wheel barrel is formed of a single integrated piece.

Many wheel configurations are possible in addition to those specifically disclosed herein. For example, the central junction rim can attach to an outboard side of the register (as shown, for example, in FIG. 1), to the inboard side of the register, or between the outer junction rim and the inner junction rim. Also, in some cases, certain components that are described herein as separate pieces may be incorporated into a single pieces, or separate pieces may be divided into separate pieces joined together. For example, in some instances a multi-piece wheel may include a wheel center piece integrally formed with an outer wheel barrel piece, but separate from a distinct inner wheel barrel piece. Similarly, the wheel center piece may be integrally formed with an inner wheel barrel piece, but separate from a distinct outer wheel barrel piece.

Although several specific examples a provided in the figures and described herein, it should be understood that these examples are not intended to limit the scope of the inventions. Many alternatives are possible as will be apparent to those of skill in the art. For example, each of the embodiments specifically disclosed herein may be modified to incorporate features described in connection with the other embodiments specifically disclosed. For example, where specific features, angles, distances, and measurements are called out in a specific embodiment, it will be understood that in many instances the other embodiments disclosed herein may include the same or similar features, angles, distances, and measurements, or may be modified so as to include the same features, angles, distances, and measurements. Also, features, angles, distances, and measurements that are shown in the drawings but are not specifically called or discussed are intended to be included in the disclosure.

The following is claimed:

1. A wheel configured to be mounted to a vehicle, the wheel comprising:
    a wheel barrel extending from an outboard side of the wheel to an inboard side of the wheel, the wheel barrel comprising a radially inner surface, the wheel barrel having a wheel barrel width extending from the outboard side of the wheel to the inboard side of the wheel;
    an inboard rim flange integrally formed with the wheel barrel on the inboard side of the wheel;
    an outboard rim flange integrally formed with the wheel barrel on the outboard side of the wheel;
    a register extending radially inwardly from the radially inner surface of the wheel barrel; and
    a wheel center piece comprising:
    a junction rim secured to the register;
    a center portion configured to attach to a vehicle;
    a plurality of spokes extending radially outwardly from the center portion; and
    a plurality of axial extensions that extend substantially parallel to the inner surface of the wheel barrel from a radially outward end of each spoke to the junction rim, wherein a radially outer surface of each axial extension is substantially parallel to a radially inner surface of the respective axial extension;
    wherein a cavity is defined between the inboard side of the wheel center piece and the inboard side of the wheel, the cavity having an axial width that is greater than half the total wheel barrel width, and the cavity being configured to accommodate braking components when attached to the front of a front wheel drive vehicle; and
    wherein the radially inner surface of the wheel barrel comprises an interior lip having an interior lip depth extending from the outboard side of the wheel to the junction rim, the interior lip depth being at least about half the total wheel barrel width.

2. The wheel of claim 1, wherein the wheel barrel comprises an inner portion extending from the register to the inboard side of the wheel and an outer portion extending from the register to the outboard side of the wheel, and wherein the plurality of axial extensions have a height that is greater than half the axial width of the outer piece of the wheel barrel.

3. The wheel of claim 2, wherein the inner portion of the wheel barrel and the outer portion of the wheel barrel are separately formed and secured together at the register.

4. The wheel of claim 1, wherein the interior lip is substantially smooth.

5. The wheel of claim 1, wherein an inboard side of the center portion of the wheel center piece is positioned closer to the outboard side of the wheel than to the junction rim.

6. The wheel of claim 1, wherein the axial extensions extend substantially parallel to the radially inner surface of the wheel barrel.

7. The wheel of claim 1, wherein the interior lip is tapered such that the interior lip has a first diameter near the outboard side of the wheel is larger than a second diameter near the junction rim.

8. A wheel configured to be mounted to a vehicle, the wheel comprising:
    a wheel barrel extending from an outboard side of the wheel to an inboard side of the wheel, the wheel barrel comprising a radially inner surface;
    an inboard rim flange integrally formed with the wheel barrel on the inboard side of the wheel;
    an outboard rim flange integrally formed with the wheel barrel on the outboard side of the wheel;
    a register extending radially inwardly from a location on the radially inner surface of the wheel barrel, wherein the register is positioned closer to the inboard side of the wheel than to the outboard side of the wheel; and
    a wheel center piece comprising:
    a junction rim secured to the register;
    a plurality of axial extensions that extend from the junction rim substantially parallel to the inner surface of the wheel barrel to the radially outwards ends of each spoke to a location that is closer to the outboard side of the wheel than to the junction rim, wherein a radially outer surface of each axial extension is substantially parallel to a radially inner surface of the respective axial extension;
    a plurality of spokes extending radially inwardly from outboard ends of the axial extensions; and
    a center portion attached to the radially inner ends of the spokes, the center portion configured to attach to a vehicle.

9. The wheel of claim 8, wherein the radially inner surface of the wheel barrel comprises a substantially smooth interior lip extending from near the outboard side of the wheel to near the junction rim.

10. The wheel of claim 9, wherein the axial extensions have a height such that they extend over more than half of an interior lip depth.

11. The wheel of claim 8, wherein the wheel barrel comprises an inner portion extending from the register to the inboard side of the wheel and an outer portion extending from the register to the outboard side of the wheel, and wherein the plurality of axial extensions have a height that is greater than half the axial width of an outer barrel piece of the wheel barrel.

12. The wheel of claim 11, wherein the inner portion of the wheel barrel and the outer portion of the wheel barrel are separately formed and secured together at the register.

13. The wheel of claim 8, wherein the interior lip is substantially smooth.

14. The wheel of claim 8, wherein an inboard side of the center portion of the wheel center piece is positioned closer to the outboard side of the wheel than to the junction nm.

15. The wheel of claim 8, wherein the center portion of the wheel center piece is positioned at about the same axial distance from the outboard side of the wheel as the outboard ends of the axial extensions.

16. A wheel center piece comprising:
    a junction rim configured to be secured to a register of a wheel barrel; a center portion configured to attach to a vehicle;

a plurality of spokes extending radially outwardly from the center portion; and a plurality of axial extensions that extend substantially parallel to the inner surface of the wheel barrel from a radially outward end of each spoke to the junction rim, wherein a radially outer surface of each axial extension is substantially parallel to a radially inner surface of the respective axial extension.

17. A wheel comprising the wheel center piece of claim 16, further comprising:

the wheel barrel extending from an outboard side of the wheel to an inboard side of the wheel, the wheel barrel comprising a radially inner surface; an inboard rim flange integrally formed with the wheel barrel on the inboard side of the wheel; an outboard rim flange integrally formed with the wheel barrel on the outboard side of the wheel; and a register extending radially inwardly from a location on the radially inner surface of the wheel barrel, wherein the junction rim is secured to the register.

18. The wheel of claim 17, wherein the register is closer to the inboard side of the wheel than to the outboard side of the wheel.

19. The wheel of claim 17, wherein the radially inner surface of the wheel barrel comprises a substantially smooth interior lip extending from near the outboard side of the wheel to near the junction rim.

20. The wheel of claim 19, wherein a cavity is defined between a wheel center piece and the inboard side of the wheel, wherein the cavity has an axial width of greater than half a total axial width of the wheel, and wherein the interior lip has an interior lip depth of greater than half the total axial width of the wheel.

21. The wheel center of claim 16, wherein the axial extensions have a height of at least about 4 inches.

* * * * *